(12) United States Patent
Fukuzumi et al.

(10) Patent No.: US 6,990,948 B2
(45) Date of Patent: Jan. 31, 2006

(54) DIRECT INJECTION ENGINE SYSTEM AND START-UP METHOD FOR DIRECT INJECTION ENGINE

(75) Inventors: Masahiro Fukuzumi, Machida (JP); Tsutomu Kikuchi, Tokyo (JP); Yuichi Iriya, Yokohama (JP); Hitoshi Ishii, Yokosuka (JP); Mitsuhiro Akagi, Yokohama (JP); Katsuaki Uchiyama, Yokohama (JP); Masahiko Yuya, Yokohama (JP); Takao Maitani, Isehara (JP); Masayuki Tomita, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/884,975

(22) Filed: Jul. 7, 2004

(65) Prior Publication Data

US 2005/0005904 A1 Jan. 13, 2005

(30) Foreign Application Priority Data

Jul. 10, 2003 (JP) .............................. 2003-194926

(51) Int. Cl.
F02B 17/00 (2006.01)
(52) U.S. Cl. .................................... 123/295; 123/576
(58) Field of Classification Search ................ 123/295, 123/305, 575, 576, 578, 1 A
See application file for complete search history.

(56) References Cited

U.S. PATENT DOCUMENTS 4,522,173 A * 6/1985 Agache ...................... 123/276
2002/0152999 A1 * 10/2002 Holder et al. ............... 123/575

FOREIGN PATENT DOCUMENTS

JP 2000-145510 A 5/2000

OTHER PUBLICATIONS

U.S. Appl. No. 10/885,030, Uchiyama et al., filed Jul. 7, 2004.

* cited by examiner

Primary Examiner—Erick Solis
(74) Attorney, Agent, or Firm—Foley & Lardner LLP (57) ABSTRACT

An engine system is capable of switching between a first fuel injection mode, in which fuel is injected from a fuel injection valve 23 directly into a combustion chamber 6 in the compression stroke, and a second fuel injection mode, in which fuel is injected from the fuel injection valve 23 directly into the combustion chamber 6 in the intake stroke. A controller 30 determines the characteristic of the fuel that is supplied to the fuel injection valve 23, selects either the first fuel injection mode or the second fuel injection mode according to the fuel characteristic, and starts an engine 1 in the selected fuel injection mode.

8 Claims, 6 Drawing Sheets

DIRECT INJECTION ENGINE SYSTEM AND START-UP METHOD FOR DIRECT INJECTION ENGINE

TECHNICAL FIELD OF THE INVENTION

This invention relates to the start-up of a direct injection engine in which fuel is injected directly into a combustion chamber.

BACKGROUND OF THE INVENTION

When homogeneous combustion is performed during a cold start in a direct injection engine by injecting fuel in the intake stroke, the three-way catalyst is not activated, and hence HC is discharged without being reduced. JP2000-145510A, published by the Japan Patent Office in 2000, discloses a technique to prevent this by detecting the engine temperature, and injecting fuel in the compression stroke at an air-fuel ratio that is regulated to the lean side of the stoichiometric air-fuel ratio when the detected temperature is lower than a predetermined temperature.

According to this technique, the amount of fuel that adheres to the wall surface of the cylinder during a cold start can be reduced, and the amount of air-fuel mixture flowing into the quench zone during stratified charge combustion can also be reduced. Moreover, the exhaust gas temperature rises, thus accelerating the oxidation reaction of the HC in the expansion stroke, and hence an overall reduction in the amount of HC can be achieved.

SUMMARY OF THE INVENTION

To start an engine by means of compression stroke fuel injection, the fuel injection amount and injection timing must be regulated such that a mass of air-fuel mixture is formed around the spark plug at a rich air-fuel ratio which enables stable ignition, and such that the average air-fuel ratio throughout the entire combustion chamber reaches a stratified charge combustion-permitting air-fuel ratio that is slightly leaner than the stoichiometric air-fuel ratio.

However, the air-fuel ratio range in which stratified charge combustion during a cold start is possible becomes narrower while deviating gradually to the rich side as the fuel vaporization rate decreases, and becomes even narrower as the fuel characteristic becomes heavier. Hence, when heavy fuel is supplied, the air-fuel ratio deviates from the preset air-fuel ratio range, leading to unstable combustion and the possibility of defective start-up.

It is therefore an object of this invention to improve the low temperature startability of a direct injection engine while suppressing exhaust gas emissions during a cold start of the engine.

In order to achieve above object, this invention provides an engine system comprising: an engine having a fuel injection valve which injects fuel into a combustion chamber, the engine being capable of switching between a first fuel injection mode, in which fuel is injected from the fuel injection valve directly into the combustion chamber in a compression stroke, and a second fuel injection mode, in which fuel is injected from the fuel injection valve directly into the combustion chamber in an intake stroke; and a controller.

The controller determines a characteristic of the fuel that is supplied to the fuel injection valve; selects either the first fuel injection mode or the second fuel injection mode according to the fuel characteristic; and starts the engine in the selected fuel injection mode.

According to an aspect of this invention, this invention provides a start-up method for an engine, the engine having a fuel injection valve which injects fuel into a combustion chamber, and being capable of switching between a first fuel injection mode, in which fuel is injected from the fuel injection valve directly into the combustion chamber in a compression stroke, and a second fuel injection mode, in which fuel is injected from the fuel injection valve directly into the combustion chamber in an intake stroke. The start-up method comprises: determining a characteristic of the fuel that is supplied to the fuel injection valve; selecting either the first fuel injection mode or the second fuel injection mode according to the fuel characteristic; and starting the engine in the selected fuel injection mode.

The details as well as other features and advantages of this invention are set forth in the remainder of the specification and are shown in the accompanying drawings.

DESCRIPTION OF THE PREFERRED EMBODIMENTS

Figure 1:
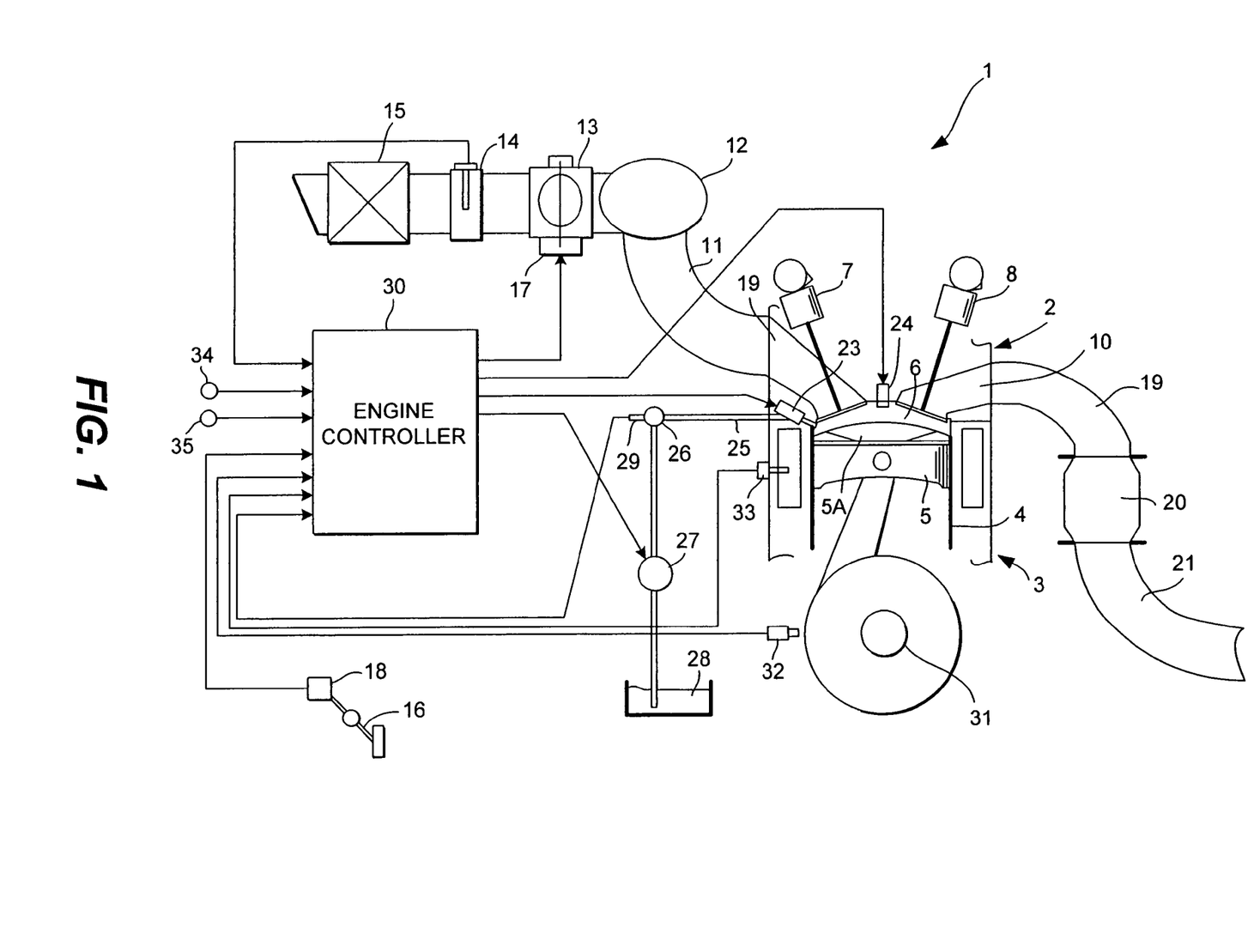
FIG. 1 is a schematic diagram of an engine system according to this invention.

Referring to FIG. 1 of the drawings, an engine 1 comprises a cylinder block 3 constituted by a cylinder head 2 and a plurality of cylinders 4 (only one of which is shown in FIG. 1). A piston 5 is accommodated inside each cylinder 4 so as to be capable of a reciprocating motion. A combustion chamber 6 is formed by the piston 5, the inner walls of the cylinder 4, and the cylinder head 2. A cavity 5A which causes injected fuel and intake air to form a tumble in the compression stroke and be burned by stratified charge combustion is formed at the crown of the piston 5. An intake port 9 and an exhaust port 10 are connected to the combustion chamber 6 via an intake valve 7 and an exhaust valve 8.

An intake manifold 11 and a collector 12 are connected upstream of the intake port 9. A throttle valve 13 for regulating the amount of intake air in the engine 1, an air flow meter 14 which measures the intake air amount, and an air cleaner 15 are provided even further upstream. The opening of the throttle valve 13 is regulated by driving a throttle motor 17 in accordance with the depression amount of an accelerator pedal 16, which is detected by an accelerator position sensor 18. The opening of the throttle valve 13 is detected by a throttle position sensor not shown in the drawing. A catalyst device 20 for purifying exhaust gas is provided downstream of the exhaust port 10 via an exhaust manifold 19, and the catalyst device 20 is connected to an exhaust pipe 21.

A fuel injection valve 23, which injects fuel directly into the combustion chamber 6, and a spark plug 24, which ignites the air-fuel mixture inside the combustion chamber 6, are provided respectively in the cylinder head 2 of each cylinder. The fuel injection valve 23 is connected to a delivery pipe 26 via a supply passage 25, and fuel is supplied from this pipe 26. Fuel from a fuel tank 28 is supplied to the delivery pipe 26 through a high-pressure fuel pump 27. A fuel pressure sensor, not shown in the drawing, for detecting the pressure of the fuel inside the delivery pipe 26, and a fuel characteristic sensor 29, which detects the characteristic of the fuel, are provided on the delivery pipe 26. The fuel characteristic sensor 29 may be constituted by an optical fuel sensor, for example, which detects changes in the refractive index of laser light in accordance with the specific gravity/heaviness of the fuel. Alternatively, another sensor such as a capacitance sensor, which detects changes in the resistance value between a pair of electrodes in the fuel in accordance with the specific gravity/heaviness of the fuel, may be used.

Various sensors are provided in the engine 1 for detecting the engine operating conditions. A crank angle sensor 32 for detecting the rotation speed of a crankshaft 31 (=the engine rotation speed) and the rotation phase (crank angle) thereof is provided in the vicinity of the crankshaft 31. A water temperature sensor 33 which detects a temperature Tw of the cooling water in the engine 1 is provided in the cylinder block 3. A battery voltage sensor 34 is provided for detecting the voltage of a battery serving as the power source of a starter motor. A starter signal indicating whether a key switch 35 is in an ON position, an OFF position, or a START position is also input. Detection signals output from each of these sensors 29, 32–35 are input into an engine controller 30 of the engine 1.

The engine controller 30 drives each of the fuel injection valves 23 on the basis of signals from the various sensors, including the sensors 29, 32–35, and in so doing executes fuel injection control and predetermined ignition control. The engine controller 30 comprises one or a plurality of microprocessors, programs and calculation maps for executing fuel injection control and ignition control, and memory for storing data and the like calculated during control execution.

The engine controller 30 functions to switch between an intake stroke fuel injection mode, in which fuel injection is executed in the intake stroke, and a compression stroke fuel injection mode, in which fuel injection is executed in the compression stroke, in accordance with the operating conditions of the engine 1.

When the key switch 35 of the engine 1 is switched from the OFF position to the ON position, the engine controller 30 determines whether the fuel that is supplied to the fuel injection valve 23 is light fuel or heavy fuel according to the heaviness (specific gravity) of the fuel in the delivery pipe 26 measured by the fuel characteristic sensor 29 at this time. When the measured heaviness H is greater than a predetermined reference value Hth, the fuel is determined to be heavy, and when smaller, the fuel is determined to be light.

The air-fuel ratio range in which stratified charge combustion during a cold start is possible varies according to the type of vehicle, environment in which the vehicle is used, the engine spec, and the air-fuel mixture formation method, etc. Therefore, the reference value Hth is determined by experiment: For example, an air-fuel ratio range (range for stratified charge combustion) in which the stability of stratified charge combustion during a cold start remains within the allowable range is determined by experiment for each fuel heaviness, and the fuel heaviness which achieves a predetermined narrow air-fuel ratio range for stratified charge combustion is determined as the reference value Hth.

When the key switch 35 is switched to the START position to start the engine, the engine controller 30 sets start-up in the compression stroke fuel injection mode (stratified charge combustion start-up) when the determination result of the fuel characteristic indicates light fuel, and sets start-up in the intake stroke fuel injection mode (homogeneous combustion start-up) when the fuel is heavy. Cranking is then begun using the starter motor, which is not shown in the drawings.

Figure 4:
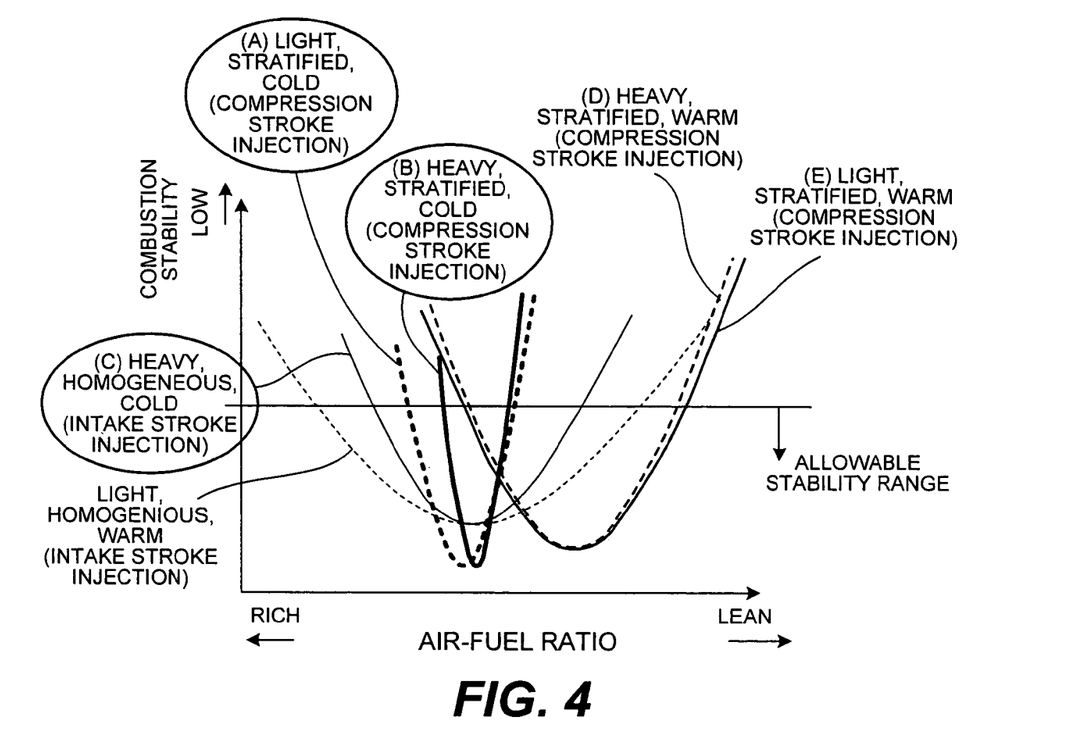
FIG. 4 is a characteristic diagram showing the relationship between the air-fuel ratio and combustion stability according to the fuel characteristic.

The reason for this is as shown in FIG. 4. That is, when start-up is performed in the compression stroke fuel injection mode in order to suppress the discharge of unburned fuel (HC) directly after the beginning of cranking, the combustion stability remains within an allowable range within a comparatively wide air-fuel ratio range when the fuel is light (see line A), and hence start-up is comparatively easy. When the fuel is heavy, on the other hand, the combustion stability remains within the allowable range in only a comparatively narrow air-fuel ratio range (see line B), and hence start-up is difficult to establish.

Hence, start-up in the intake stroke fuel injection mode is set for heavy fuel. As shown by line C in FIG. 4, in the intake stroke fuel injection mode the combustion stability remains within the allowable range in a comparatively wide air-fuel ratio range even during a cold start using heavy fuel. Since the time required to vaporize the fuel injected into the combustion chamber 6 is secured, ignition and combustion are performed with stability, and the engine 1 can be started reliably.

Following warm-up, the air-fuel ratio range in which the combustion stability remains within the allowable range in the compression stroke fuel injection mode is comparatively wide for both heavy fuel and light fuel (see line D and line E). The air-fuel ratio range in which the combustion stability remains within the allowable range in the intake stroke fuel injection mode is even wider when the fuel is light (see line F).

Figure 5:
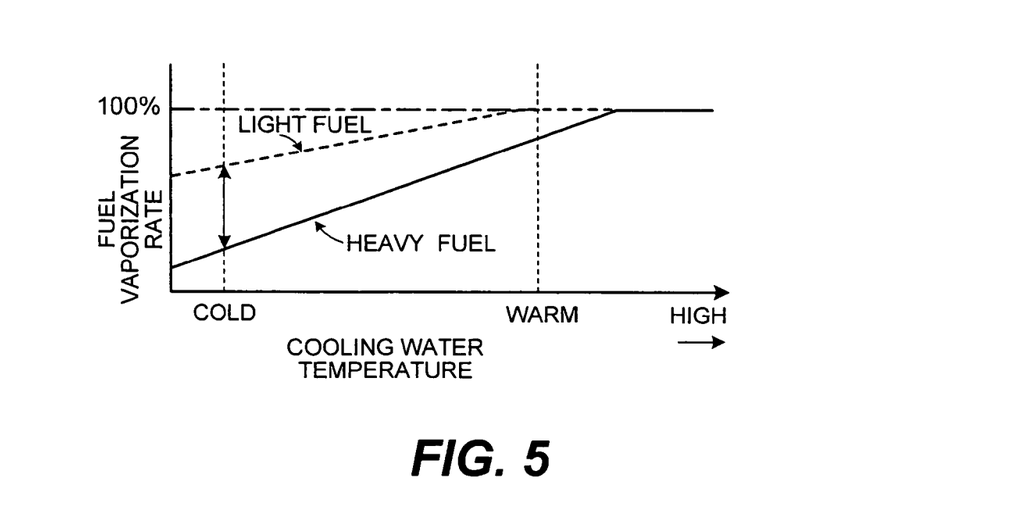
FIG. 5 is a characteristic diagram showing the relationship between the cooling water temperature and the fuel vaporization rate.

The air-fuel ratio range in which the combustion stability remains within the allowable range in the compression stroke fuel injection mode varies according to the fuel vaporization rate. As shown in FIG. 5, the fuel vaporization rate of both light fuel and heavy fuel drops as the cooling water temperature decreases, and accordingly, the air-fuel ratio range in which the combustion stability is within the allowable range narrows. The drop in the fuel vaporization rate of heavy fuel is greater than the drop in the fuel vaporization rate of light fuel. Hence in the case of heavy fuel, the air-fuel ratio range in which the combustion stability is within the allowable range in the compression stroke fuel injection mode narrows.

During start-up in the compression stroke fuel injection mode, a mass of air-fuel mixture which is comparatively rich and has a stable ignition property is formed around the spark plug 24, and hence the air-fuel ratio of the entire combustion chamber is slightly leaner than the stoichiometric air-fuel ratio.

During start-up (cranking) of the engine 1, the engine controller 30 determines that ignition and combustion have been performed and the engine 1 has been started up with certainty when the engine rotation speed Ne is greater than a complete combustion rotation speed Nest, and thus sets the fuel injection mode to the intake stroke fuel injection mode in order to warm the engine 1. As a result, fuel is injected in the intake stroke and homogeneous combustion is performed.

In other words, if the fuel injection mode during start-up is set to the compression stroke fuel injection mode when the engine 1 has been started with certainty, the engine controller 30 switches the fuel injection mode to the intake stroke fuel injection mode to promote warm-up of the engine 1, and when the fuel injection mode during start-up is set to the intake stroke fuel injection mode, the engine controller 30 maintains the intake stroke fuel injection mode.

In the intake stroke fuel injection mode during a warm-up operation, the air-fuel ratio in the combustion chamber is in the vicinity of the stoichiometric air-fuel ratio, and hence stable combustion is maintained, and emissions, in particular the NOx discharge characteristic, are improved.

During a warm-up operation of the engine 1 following start-up, the engine controller 30 determines that warm-up is complete when the cooling water temperature Tw exceeds a warm-up completion temperature Twst. Thereafter, the engine controller 30 switches between the intake stroke fuel injection mode, in which fuel injection is executed in the intake stroke, and the compression stroke fuel injection mode, in which fuel injection is executed in the compression stroke, in accordance with the operating conditions.

Figure 2:
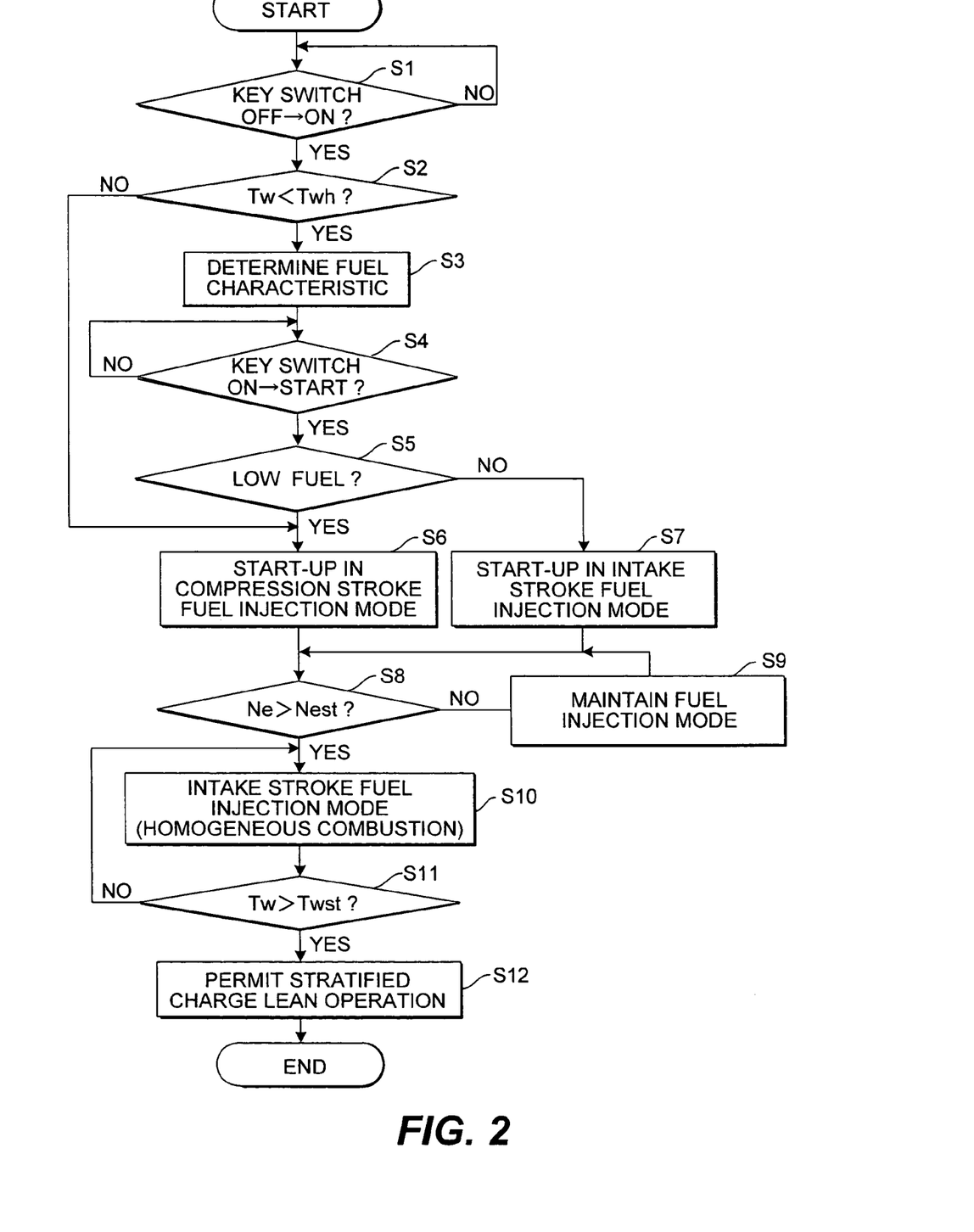
FIG. 2 is a flowchart of start-up control.

Start-up control in the engine system according to this invention, constituted as described above, will now be described. FIG. 2 is a flowchart of the start-up control. The engine controller 30 executes the processing shown in this flowchart periodically during engine start-up as interrupt processing. FIGS. 3A–3E are time charts showing the state of the start-up control in FIG. 2.

First, in a step S1, a determination is made as to whether or not the position of the key switch 35 has changed from OFF to ON. When the position of the key switch 35 is OFF, the processing of the flowchart is not begun. When the position of the key switch 35 changes from OFF to ON, it is determined that a start-up operation of the engine 1 has begun (see time t1 in FIGS. 3A–3E).

In a step S2, a determination is made as to whether or not the cooling water temperature Tw at this time is lower than a predetermined high temperature Twh that is set in advance to determine whether the engine 1 has completed warm-up. When the cooling water temperature Tw is lower than the predetermined high temperature Twh, the routine advances to a step S3, and when it is higher, the routine advances to a step S6. The predetermined high temperature Twh may be set arbitrarily, for example between fifty and seventy degrees centigrade.

In the step S3, the fuel characteristic (light fuel or heavy fuel) is determined on the basis of the refractive index of the fuel inside the delivery pipe 26, which is detected by the fuel characteristic sensor 29. A map defining the relationship between the refractive index and heaviness, and a reference value for determining whether fuel is to be considered light or heavy according to the degree of heaviness are stored in the engine controller 30, and hence the engine controller 30 determines the fuel characteristic by converting the detected refractive index of the fuel into a heaviness value by referring to the map, and comparing the conversion value H to the reference value Hth.

In a step S4, a determination is made as to whether or not the position of the key switch 35 has been switched to START. If the position of the key switch 35 has been switched to START, the routine advances to a step S5, and cranking of the engine 1 is begun using the starter motor not shown in the drawings (see time t2 in FIGS. 3A–3E).

In the step S5, it is determined whether the fuel is light fuel or heavy fuel on the basis of the result of the step S3. When the fuel is light fuel, the routine advances to the step S6 and when it is heavy fuel the routine advances to the step S7.

In the step S6, start-up in the compression stroke fuel injection mode (stratified charge combustion start-up) is set such that fuel from the fuel injection valve 23 is injected into the combustion chamber 6 in the compression stroke. The injected light fuel mixes with intake air forming a tumble (a revolving air flow which flows in from one side of the cavity 5A, flows along the wall surface of the cavity 5A, flows out from the other side of the cavity 5A to reach the spark plug 24, passes through the spark plug 24, and flows back into the cavity 5A) in the space within the combustion chamber 6 that is surrounded by the cavity 5A in the crown of the piston 5 and the cylinder head 2, and is thus ignited by the spark plug 24, whereby stratified charge combustion is performed.

Figures 3A, 3B, 3C:
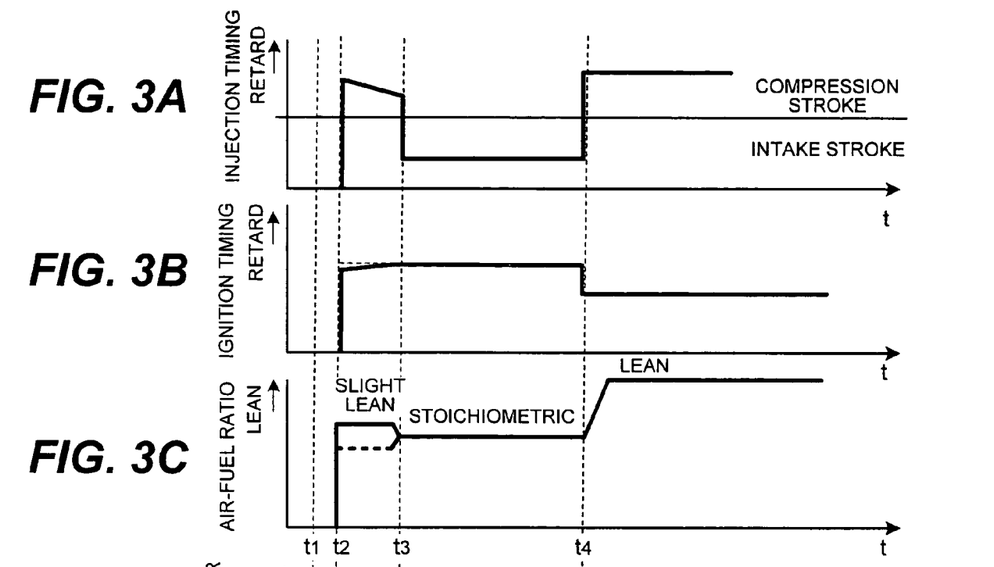
FIGS. 3A–3E are time charts of the start-up control.

As shown by the solid line in FIG. 3C, during start-up in the compression stroke fuel injection mode (stratified charge combustion start-up), fuel is sprayed such that the air-fuel ratio in the combustion chamber 6 becomes a slightly lean air-fuel ratio, and the fuel injection timing is regulated as shown by the solid line in FIG. 3A so as to move further toward the advance side as the engine rotation speed Ne increases. As a result, the injected fuel is assured of reaching the periphery of the spark plug 24, and stratified charge combustion is performed with certainty (times t2–t3). Further, since the air-fuel ratio is set to be slightly lean, the amount of fuel flowing into the quench zone and adhering to the wall surface of the cylinder 4 can be reduced. In this case, the oxidation reaction of unburned fuel is accelerated in the expansion stroke, and the exhaust gas temperature rises. Hence unburned fuel and its discharge to the outside can be suppressed, and the catalyst 20 can be activated quickly (see times t2–t3).

In the step S7, meanwhile, start-up in the intake stroke fuel injection mode (homogeneous combustion start-up) is set such that fuel is injected from the fuel injection valve 23 into the combustion chamber 6 in the intake stroke. The injected heavy fuel mixes evenly with the intake air in the combustion chamber 6 from the intake stroke through the combustion stroke, and when sufficiently vaporized, the fuel is ignited by the spark plug 24 such that homogeneous combustion is performed.

As shown by the broken line in FIG. 3A, during start-up in the intake stroke fuel injection mode, fuel is injected into the combustion chamber 6 in the intake stroke, and as shown by the broken line in FIG. 3C, fuel injection is performed such that the air-fuel ratio is slightly richer than the stoichiometric air-fuel ratio. As shown in FIG. 3B, the ignition timing is retarded slightly. In the intake stroke fuel injection mode, the time required for the fuel injected into the combustion chamber 6 to vaporize is secured, and hence ignition and combustion can be performed with stability (see times t2–t3).

In a step S8, a determination is made as to whether or not the engine rotation speed Ne during cranking is greater than the complete combustion rotation speed Nest, and when the engine rotation speed Ne exceeds the complete combustion rotation speed Nest, the routine advances to a step S10. When the engine rotation speed Ne is lower than the complete combustion rotation speed Nest, the routine advances to a step S9. In the step S9, the processing of the step S6 is continued in the case of light fuel. In case of heavy fuel, the processing of the step S7 is continued, thereby promoting combustion and raising the cranking rotation speed (engine rotation speed Ne).

When the engine rotation speed Ne during cranking exceeds the complete combustion rotation speed Nest, it is determined in the step S8 that the engine rotation speed Ne has exceeded the complete combustion rotation speed Nest, and the routine advances to the step S10. In the step S10, the intake stroke fuel injection mode (homogeneous combustion) is set in order to perform a warm-up operation. In a step S11, a determination is made as to whether or not warm-up is complete, and the warm-up operation by means of intake stroke fuel injection is continued until warm-up is complete. As shown by the solid line in FIG. 3A, intake stroke fuel injection is begun at the time t3 to perform the warm-up operation, and as shown by the solid line in FIG. 3C, the fuel injection amount is set such that the air-fuel ratio equals the stoichiometric air-fuel ratio at the time t3, or in other words such that stoichiometric fuel injection is performed in relation to the intake air amount.

When the cooling water temperature Tw rises above the warm-up completion temperature Twst due to the continuation of an operation in the intake stroke fuel injection mode, the condition (warm-up completion condition) cooling water temperature Tw>warm-up completion temperature Twst is satisfied at the time of the determination in the step S11, and hence the routine advances to a step S12, where a stratified charge lean operation by means of compression stroke fuel injection is permitted (see time t4). The processing then ends.

Figure 6:
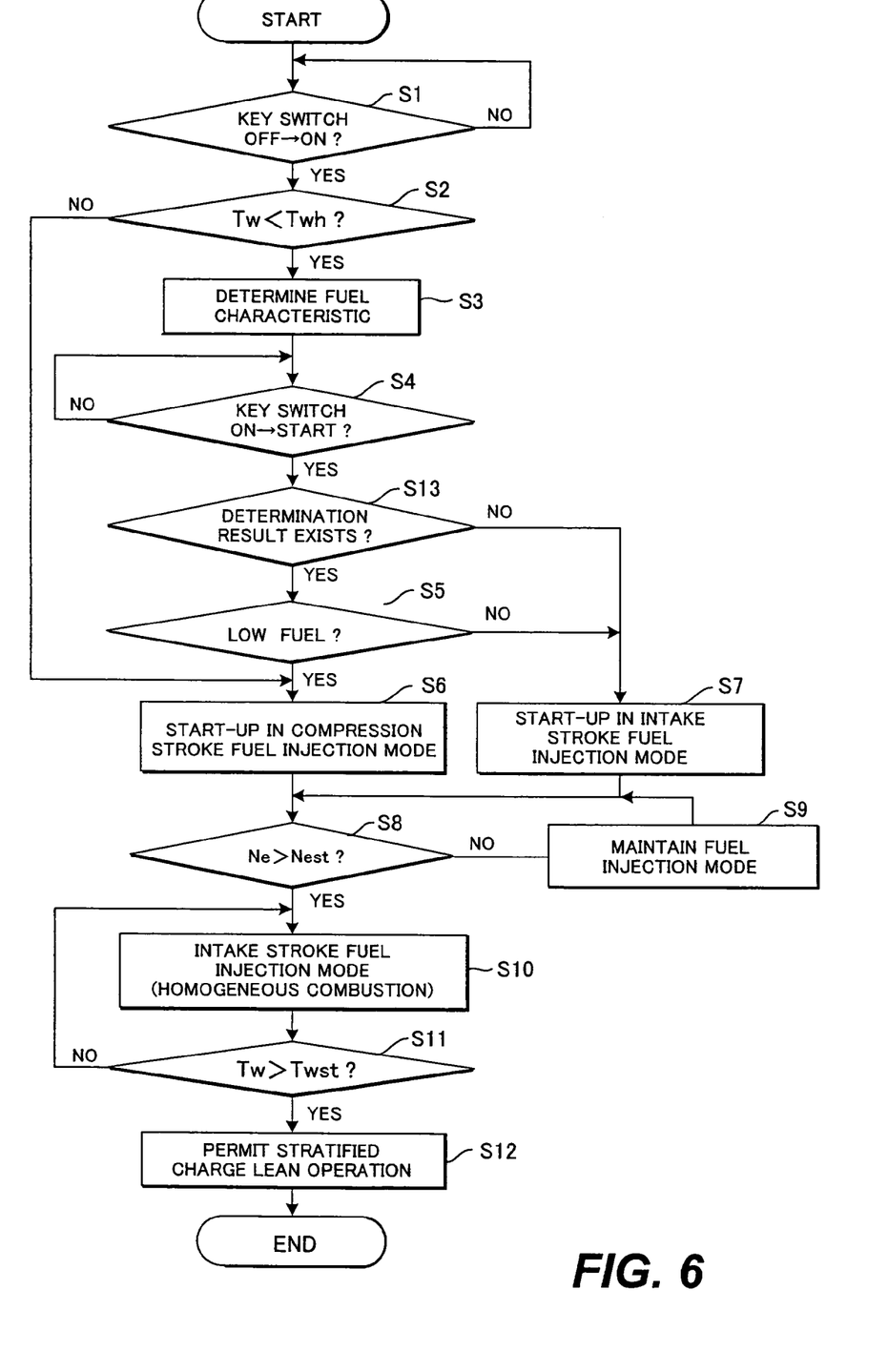
FIG. 6 is a flowchart of start-up control in a second embodiment.

FIG. 6 is a flowchart showing another example of start-up control which may be applied even when a determination result of the fuel characteristic cannot be produced (second embodiment). The flowchart in FIG. 6 differs from the flowchart in FIG. 2 of the first embodiment in that a step S13 is added between the steps S4 and S5.

In the step S13, a determination is made as to whether or not a result exists for the fuel characteristic determination of the step S3. If a determination result exists, the routine advances to the step S5, but if no determination result exists, the routine advances to the step S7.

When there is no determination result of the fuel characteristic and start-up in the compression stroke fuel injection mode is set, start-up is possible if the fuel is light, but is sometimes impossible if the fuel is heavy. However, when start-up in the intake stroke fuel injection mode is set, start-up is possible regardless of whether the fuel is heavy or light, and hence the engine 1 can be started with certainty.

Figure 7:
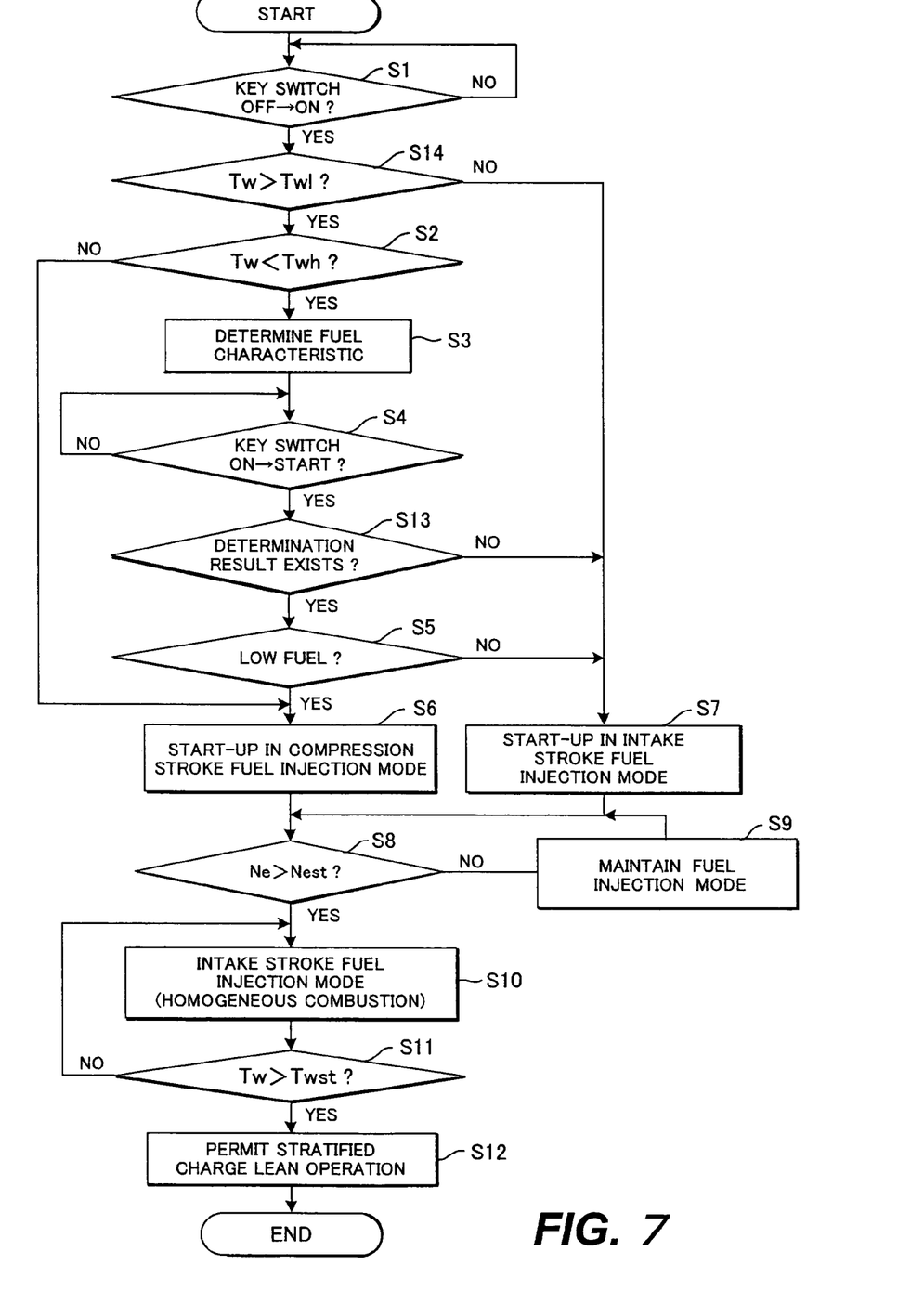
FIG. 7 is a flowchart of start-up control in a third embodiment

In the embodiment described above, either the compression stroke fuel injection mode or the intake stroke fuel injection mode is set according to the heaviness of the fuel characteristic even when the cooling water temperature Tw is extremely low. However, a step S14 may be added as shown in FIG. 7 such that when the cooling water temperature Tw is at an extremely low temperature that is lower than a predetermined low temperature Twl (between ten and fifteen degrees centigrade, for example) while the key switch 35 is ON, start-up in the intake stroke fuel injection mode (homogeneous combustion start-up) is selected from the initial stage of cranking regardless of the fuel characteristic (third embodiment). In FIG. 7, the step S14 has been added to the second embodiment shown in FIG. 6, but the step S14 may be added in a similar fashion to the first embodiment shown in FIG. 2.

At extremely low temperatures, it is sometimes impossible to establish start-up in the compression stroke fuel injection mode even when the fuel is light. However, by performing start-up in the intake stroke fuel injection mode regardless of the fuel characteristic, when the cooling water temperature Tw is lower than the predetermined low temperature Twl, as shown in FIG. 7, the engine 1 can be started reliably even at extremely low temperatures.

Figure 3D:
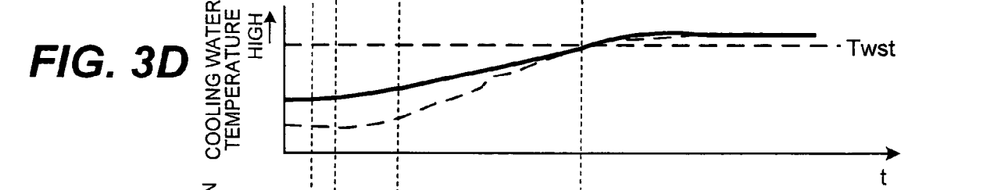
Figure 3E:
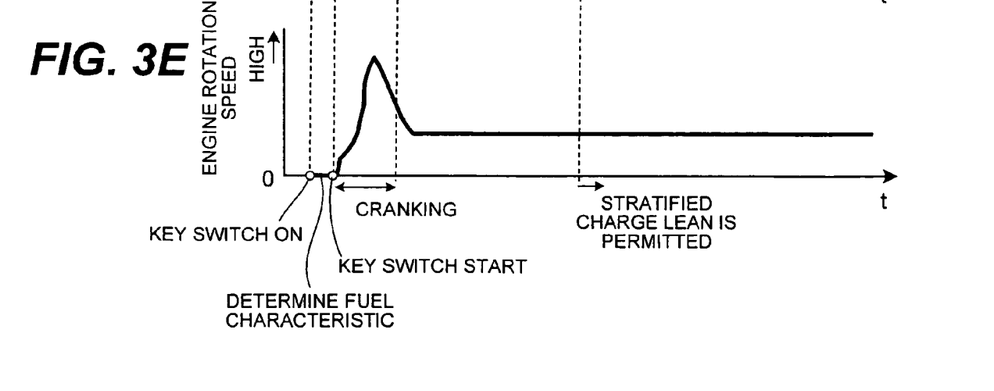

The water temperature characteristic shown by the broken line in FIG. 3D is that of a case in which the engine 1 is started in the intake stroke fuel injection mode at an extremely low temperature.

The following effects are achieved by these embodiments.

(i) The characteristic of the fuel that is supplied to the fuel injection valve 23 is determined, and in accordance with the determination result, the fuel injection mode during a cold start is set to either the compression stroke fuel injection mode or the intake stroke fuel injection mode. Thus when the fuel is determined to be light fuel, which has a wide air-fuel ratio range for establishing stratified charge combustion, fuel is injected in the compression stroke such that the air-fuel mixture is stratified within the combustion chamber 6. As a result, the amount of unburned fuel flowing along the walls of the combustion chamber 6 or entering the top land of the piston 5 can be reduced, leading to a reduction in the amount of HC that is discharged by the engine 1.

If, on the other hand, the fuel is determined to be heavy fuel, which has a narrow air-fuel ratio range within which stratified charge combustion can be established, start-up is performed with the fuel injection mode switched to the intake stroke fuel injection mode, and hence combustion instability and start-up failures can be prevented even when the fuel is heavy.

(ii) When the cooling water temperature Tw during engine start-up exceeds the predetermined high temperature Twh (between fifty and seventy degrees centigrade, for example), start-up is performed with the fuel injection mode during engine start-up set to the compression stroke fuel injection mode.

In a warmed condition, combustion stability in the compression stroke fuel injection mode is held within an allowable range even when the fuel is heavy, and hence fuel is injected in the compression stroke such that the air-fuel mixture is stratified within the combustion chamber. As a result, the amount of unburned fuel flowing along the walls of the combustion chamber 6 or entering the top land of the piston 5 can be reduced, leading to a reduction in the amount of HC that is discharged by the engine 1 during start-up.

(iii) At extremely low temperatures when the cooling water temperature Tw during engine start-up falls below the predetermined low temperature Twl (between ten and fifteen degrees centigrade, for example), start-up in the intake stroke fuel injection mode is set regardless of the fuel characteristic determination result. At extremely low temperatures, it is sometimes impossible to establish start-up in the compression stroke fuel injection mode even when the fuel is light, but in so doing, the engine 1 can be started reliably even at extremely low temperatures.

(iv) When the determination result of the fuel characteristic is unknown, the fuel injection mode during engine start-up is set to the intake stroke fuel injection mode, and hence the engine 1 can be started reliably whether the fuel is light or heavy.

It should be noted that in the embodiments described above, the fuel injection mode is set to the intake stroke fuel injection mode during a warm-up operation such that homogeneous combustion is performed. However, the compression stroke fuel injection mode may be set such that stratified charge combustion is performed. It is also possible to move from stratified charge combustion in the compression stroke fuel injection mode to homogeneous combustion in the intake stroke fuel injection mode as the cooling water temperature rises.

The entire contents of Japanese Patent Application P2003-194926 (filed Jul. 10, 2003) are incorporated herein by reference.

Although the invention has been described above by reference to a certain embodiment of the invention, the invention is not limited to the embodiment described above. Modifications and variations of the embodiments described above will occur to those skilled in the art, in the light of the above teachings. The scope of the invention is defined with reference to the following claims.

What is claimed is:

1. An engine system comprising:
    an engine having a fuel injection valve which injects fuel into a combustion chamber, the engine being capable of switching between a first fuel injection mode, in which fuel is injected from the fuel injection valve directly into the combustion chamber in a compression stroke, and a second fuel injection mode, in which fuel is injected from the fuel injection valve directly into the combustion chamber in an intake stroke; and
    a controller constituted to:
    determine a characteristic of the fuel that is supplied to the fuel injection valve;
    select one of the first fuel injection mode and the second fuel injection mode according to the fuel characteristic; and
    start the engine in the selected fuel injection mode.

2. The engine system as defined in claim 1, wherein the controller is further constituted to start the engine in the second fuel injection mode when it is determined that a heaviness of the fuel is greater than a predetermined value.

3. The engine system as defined in claim 1, wherein the controller is further constituted to start the engine in the first fuel injection mode when it is determined that a heaviness of the fuel is smaller than the predetermined value.

4. The engine system as defined in claim 1, wherein the controller is further constituted to:
    determine a cooling water temperature during engine start-up; and
    start the engine in the first fuel injection mode, regardless of the fuel characteristic, when the cooling water temperature during engine start-up is higher than a predetermined high temperature.

5. The engine system as defined in claim 1, wherein the controller is further constituted to:
    determine the cooling water temperature during engine start-up; and
    start the engine in the second fuel injection mode, regardless of the fuel characteristic, when the cooling water temperature during engine start-up is lower than a predetermined low temperature.

6. The engine system as defined in claim 1, wherein the controller is further constituted to start the engine in the second fuel injection mode when the fuel characteristic is unknown.

7. A start-up method for an engine, the engine having a fuel injection valve which injects fuel into a combustion chamber, and being capable of switching between a first fuel injection mode, in which fuel is injected from the fuel injection valve directly into the combustion chamber in a compression stroke, and a second fuel injection mode, in which fuel is injected from the fuel injection valve directly into the combustion chamber in an intake stroke, the start-up method comprising:
    determining a characteristic of the fuel that is supplied to the fuel injection valve;
    selecting one of the first fuel injection mode and the second fuel injection mode according to the fuel characteristic; and
    starting the engine in the selected fuel injection mode.

8. An engine system comprising:
    an engine having a fuel injection valve which injects fuel into a combustion chamber, the engine being capable of switching between a first fuel injection mode, in which fuel is injected from the fuel injection valve directly into the combustion chamber in a compression stroke, and a second fuel injection mode, in which fuel is injected from the fuel injection valve directly into the combustion chamber in an intake stroke;
    means for determining a characteristic of the fuel that is supplied to the fuel injection valve;
    means for selecting one of the first fuel injection mode and the second fuel injection mode according to the fuel characteristic; and
    means for starting the engine in the selected fuel injection mode.

* * * * *